(12) United States Patent
Komissarov et al.

(10) Patent No.: US 11,288,837 B2
(45) Date of Patent: Mar. 29, 2022

(54) METHOD OF INFLUENCING VIRTUAL OBJECTS OF AUGMENTED REALITY

(71) Applicant: DEVAR ENTERTAINMENT LIMITED, Nicosia (CY)

(72) Inventors: Andrei Valerievich Komissarov, p. Novaya Myza (RU); Anna Igorevna Belova, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 16/876,789

(22) Filed: May 18, 2020

(65) Prior Publication Data

US 2020/0279396 A1    Sep. 3, 2020

Related U.S. Application Data

(63) Continuation-in-part of application No. 15/773,248, filed as application No. PCT/RU2016/050070 on Nov. 17, 2016, now abandoned.

(30) Foreign Application Priority Data

Nov. 18, 2015   (RU) ................................. 2015149499

(51) Int. Cl.
    *G06T 7/73*  (2017.01)
    *G06F 3/048*  (2013.01)
    *G06T 19/20*  (2011.01)
(52) U.S. Cl.
    CPC ................ *G06T 7/73* (2017.01); *G06T 19/20* (2013.01); *G06T 2207/30204* (2013.01); *G06T 2219/2016* (2013.01)

(58) Field of Classification Search
CPC . G06F 3/048; G06T 7/73; G06T 7/277; G06T 19/006; G06T 2207/10016; G06T 2207/10024; G06T 2207/20016; G06T 2207/20081; G06T 2207/20084; G06T 2207/30204; G06T 2207/30241; G06T 2207/30244
See application file for complete search history.

(56) References Cited

U.S. PATENT DOCUMENTS

| 2013/0141461 A1* | 6/2013 | Salter ................. G06K 9/00671 345/633 |
| 2016/0260259 A1* | 9/2016 | Rueb .................... H04N 9/3161 |

* cited by examiner

*Primary Examiner* — Lisa S Landis
(74) *Attorney, Agent, or Firm* — Nadya Reingand; Yan Hankin

(57) ABSTRACT

The invention relates to methods for acting on augmented reality virtual objects. The coordinates of a device for creating and viewing augmented reality are determined in relation to a real-world physical marker by means of analysis of an image from a camera of the device; a virtual camera is positioned in calculated coordinates of the device in relation to a physical base coordinate system in such a way that the marker, which is visible to the virtual camera, is positioned in the field of vision thereof, just as the physical marker is positioned in the field of vision of the device camera; light sources captured by the camera of the device can be used as the physical marker; a vector is calculated corresponding to a direction from the marker to the virtual camera; information is generated relating to all camera movements. A system of preliminary image processing is implemented.

4 Claims, 1 Drawing Sheet

METHOD OF INFLUENCING VIRTUAL OBJECTS OF AUGMENTED REALITY

CROSS-REFERENCE TO RELATED APPLICATIONS

The present patent application is Continuation-in-Part of the U.S. patent application Ser. No. 15/773,248, filed on May 3, 2018, which is a National Stage application from International Application PCT/RU2016/050070, filed on Nov. 17, 2016, which claims priority from Russian Patent Application RU2015149499, filed on Nov. 18, 2015; said applications and their disclosures being incorporated herein by reference in their entireties.

TECHNICAL FIELD OF THE INVENTION

The present invention relates to methods of influencing augmented reality virtual objects wherein markers of a real three-dimensional space are determined from images obtained from a video camera device to create and view an augmented reality, form a physical base coordinate system tied to the spatial position of markers of a real three-dimensional space, devices for creating and viewing augmented reality relative to the basic coordinate system, specify the coordinates of the three-dimensional virtual objects of augmented reality in the base coordinate system, perform the specified actions for modifying the virtual objects for all or a part of the objects from the generated set of virtual objects of augmented reality using user's motion.

The following terms are used in this paper.

A virtual object is an object created by technical means, transmitted to a person through his senses: sight, hearing, and others.

Point of interest (a characteristic point)—the point of the image, which has a high local informativeness. As a numerical measure of informativeness, various formal criteria are proposed, called interest operators. The operator of interest must ensure a sufficiently accurate positioning of the point in the image plane. It is also necessary that the position of the point of interest possess sufficient resistance to photometric and geometric distortions of the image, including uneven changes in brightness, shift, rotation, change in scale, and angular distortions.

The Kalman filter is an effective recursive filter that estimates the state vector of a dynamic system using a series of incomplete and noisy measurements.

Image pyramids are a collection of images obtained from the original image by its sequential compression until the breakpoint is reached (of course, the endpoint may be one pixel).

Smartphone (English smartphone—smart phone)—phone, supplemented by the functionality of a pocket personal computer.

BACKGROUND ART

Currently, an increasing number of people use various electronic devices and interact with virtual objects. This happens not only in computer games, but also in the learning process, as well as, for example, in a remote trade of goods, when the buyer decides to purchase using a virtual model of goods.

There is a well-known method of influencing the virtual objects of augmented reality, in which markers of real three-dimensional space are determined from the images obtained from the video camera of the device to create and view augmented reality, form a physical base coordinate system tied to the spatial position of markers of real three-dimensional space, determine the coordinates of the device to create and view the augmented reality relative to the base coordinate system, specify the coordinates of the three-dimensional virtual objects of the augmented reality in the base coordinate system, perform the specified actions for modifying the virtual objects for all or a part of objects from the generated set of virtual objects of the augmented reality, see the description of the Russian patent for invention No. 2451982 of May 27, 2012.

This method is the closest in technical essence and achieved technical result and is chosen for the prototype of the proposed invention as a method.

The disadvantage of this prototype is that interaction with virtual objects is done using a separate device, which determines the position of the user in space and the need to respond to changing the user's position. Simply changing the position in space of the device for creating and viewing the augmented reality does not change the virtual object, except for changing its orientation on the device's display.

DISCLOSURE OF THE INVENTION

Based on this original observation, the present invention is mainly aimed at proposing a method for influencing augmented reality virtual objects, in which markers of real three-dimensional space are determined from images obtained from a video camera device adapted to create and view augmented reality, form a physical base coordinate system tied to the spatial position of the markers of the real three-dimensional space, determine the coordinates of the device adapted to create and view an augmented reality relative to the basic coordinate system, determine the coordinates of the three-dimensional virtual objects of the augmented reality in the base coordinate system, perform the said dynamic actions for modifying the virtual objects for all or a part of objects from the generated set of virtual objects of the augmented reality by means of recognizing user motions or actions, and additionally or alternatively recognizing certain events related to the lighting environment or lighting sources of the real three-dimensional environment. This allows at least to smooth out at least one of the specified above the shortcomings of the prior art, namely achieving additional interaction with virtual objects by changing the position of the device to create and view the augmented reality associated with additional reactions of the virtual object, in addition to simply changing the orientation of the virtual object on the device's display, thereby achieving the technical objective.

In order to achieve this objective, coordinates of the device adapted to create and view augmented reality are determined relative to the actual physical marker by analyzing the image from the device camera. When determining said coordinates a preprocessing system for the images acquired from the camera of the device is used. Said preprocessing system determines interest points calculated based upon FAST points of the acquired images, and further calculates the coordinates transformation matrix using Dynamic HOFR-SLAM and DHOFR-SLAM algorithms, as set forth below. A virtual camera is placed in the calculated coordinates of the device adapted to create and view the added reality relative to the physical base coordinate system so that the one or more marker located in its field of vision is visible in the same way as the one or more physical marker located in the field of view of the physical camera of the device adapted to create and view the augmented reality, the vector corresponding to the direction from the marker to the virtual camera is calculated in real time, adjusted by successive iteration in real time with respect to all movements of the camera relative to the marker, i.e. turning, approaching and tilting.

Thanks to these advantageous characteristics, it becomes possible to provide additional interaction with virtual, said interaction associated with additional reactions of the virtual object objects by changing position of the device adapted to create and view the augmented reality, said interaction provided in addition to simply changing the orientation of the virtual object on the device's display. This is due to the fact that it becomes possible to accurately determine the position of the device adapted to create and view augmented reality, including the direction in which it is placed. Therefore, it becomes possible to perform the specified actions for modifying and activating certain preprogrammed actions and reactions of the virtual objects for all or a part of objects of the generated set of virtual objects of augmented reality in that specific direction.

Note that the vector can be specified in any way, not only by the direction, but also by three coordinates, one or more coordinates and one or more angles, polar coordinates, Euler angles, or quaternions.

There is an embodiment of the invention in which information is generated about all movements of the camera relative to the marker by analyzing the video stream received from the device to create and view the augmented reality.

Thanks to this advantageous characteristic, it becomes possible to calculate the direction in which the device is placed to create and view the augmented reality in real time and at each next time to calculate corrections to the previous calculated position.

There is an embodiment of the invention in which analysis of the image from the device camera is performed by means of an algorithm for searching for points of interest using Dynamic HOFR-SLAM and DHOFR-SLAM algorithms.

FAST (Features from Accelerated Segment Test) is a descriptor search algorithm. Dynamic HOFR-SLAM, or DHOFR-SLAM is an algorithm developed based upon known FAST detector and a DHOFR descriptor algorithms. Algorithm DHOOFR or Dynamic Hessian ORB—Overlapped FREAK (Fast Retina Keypoint) designed to use FAST points on an image pyramid, as will be appreciated by a skilled person. The DHOOFR algorithm is a descriptor algorithm of the FREAK class of algorithms. Algorithms of this class use a distribution similar to that of the human retina, wherein the size of the viewed window increases with distance from the center. The density of points decreases exponentially with distance from the center.

The following specialized methods of searching for points of interest can also be utilized:

The SIFT (Scale Invariant Feature Transform) method detects and describes local features of the image. The characteristics obtained by means of it are invariant with respect to scale and rotation, are resistant to a number of affine transformations, noise. It is to use the Gauss pyramid, which is built for the image. Then the images are reduced to the same size, and their difference is calculated. And as the candidates for the points of interest, only those pixels that are very different from the others are selected, this is done, for example, by comparing each pixel of the image with several neighbors of a given scale, with several corresponding neighbors in a larger and a smaller scale. A pixel is selected as a point of interest only if its brightness is PCA-SIFT (PCA, Principal Component Analysis) descriptor is one of the variations of SIFT, in which the descriptor dimension is reduced by analysis of the main components. This is achieved by finding the space of eigenvectors, which are subsequently projected on the feature vectors.

SURF (Speeded Up Robust Features), which is several times faster than SIFT. In this approach, integrated images are used to accelerate the search for points of interest. The value at each point of the integral image is calculated as the sum of the values at a given point and the values of all the points that are above and to the left of the given point. With the help of integral images for constant time, the so-called rectangular filters are computed, which consist of several rectangular regions.

MSER and LLD methods are the most invariant to affine transformations and scale-up. Both methods normalize 6 parameters of affine distortions. More in detail we will stop on MSER. "Extreme areas" is the name of the method obtained due to the sorting of the special points by intensity (in the lower and upper levels). A pyramid is constructed, at which the initial image corresponding to the minimum intensity value contains a white image, and at the last level, corresponding to the maximum intensity value, black.

Harris-Affine normalizes the parameters of affine transformations. Harris uses angles as special areas, and identifies key points in a large-scale space, using the approach proposed by Lindenberg. Affine normalization is carried out by a repetitive procedure in order to evaluate the parameters of the elliptical region and normalize them. With each repetition of the elliptic region, the parameters are evaluated: the difference between the proper moments of the second-order matrices of the selected region is minimized; the elliptical region is normalized to a circular one; an assessment of the key point, its scale on a space scale.

Hessian—Affine uses blobs instead of corners as a special area. The determinant of the local maxima of the Hessian matrix is used as the base points. The rest of the method is the same as Harris-Affine.

ASIFT—the idea of combining and normalizing the main parts of the SIFT method. SIFT detector normalizes rotation, movement and simulates all images, remote from search and request.

GLOH (Gradient location-orientation histogram) is a modification of the SIFT descriptor, which is built to improve reliability. In fact, the SIFT descriptor is calculated, but the polar grid of the neighborhood partitioning into bins is used DAISY is initially introduced to solve the problem of matching images in the case of significant external changes, i.e. This descriptor, in contrast to the previously discussed ones, operates on a dense set of pixels of the entire image.

BRIEF—descriptor (Binary Robust Independent Elementary Features) provides recognition of identical parts of the image, which were taken from different points of view. At the same time, the task was to minimize the number of computations performed. The algorithm of recognition is reduced to the construction of a random forest (randomize classification trees) or naive Bayesian classifier on some training set of images and subsequent classification of test image areas.

There is also an embodiment of the invention wherein image analysis from the device camera is performed by an image classifier algorithm.

There is an embodiment of the invention wherein image analysis from the device camera is performed by the Kalman Filter algorithm.

Thanks to this advantageous characteristic, it becomes possible to analyze incomplete and noisy images, using an effective recursive filter that estimates the state vector of a dynamic system using a series of incomplete and noisy measurements. The idea of Kalman in this case is to get the best approximation to the true coordinates of the images from inaccurate camera measurements and the predicted positions of the image boundaries. The accuracy of the filter depends on the time used, which means improving stability of output of the image on subsequent frames.

There is an embodiment of the invention wherein the image analysis from the camera of the device is made by means of the algorithm "Image Pyramids".

Due to this advantageous characteristic, it becomes possible to shorten the image processing time and determine more accurate initial approximations for processing the lower levels based upon the processing results of the upper levels.

BRIEF DESCRIPTION OF THE DRAWINGS

Other features and advantages of this group of inventions clearly follow from the description given below for illustration and not being limiting, with reference to the accompanying drawings wherein.

The object marker is designated as 1. The device adapted for creating and viewing the augmented reality is 2, it further shows the video camera 21 and the display 22.

Devices such as a smartphone, a computer tablet or devices such as glasses of added reality can be used as a device adapted for creating and viewing augmented reality.

The image obtained from the video camera of the device adapted to create and view augmented reality is shown as 23.

The physical base coordinate system is associated with the marker designated as $O_m X_m Y_m Z_m$.

The coordinates of the device 2 adapted for creating and viewing the augmented reality relative to the base coordinate system, while the device 2 itself has its own coordinate system $O_n X_n Y_n Z_n$.

A vector corresponding to the direction from marker 1 to virtual camera 21 is designated as R.

Implementation of the Invention

The device for interacting with virtual objects works as follows. The most exhaustive example of the implementation of the invention is provided below, bearing in mind that this example does not limit the application of the invention.

Figure 1:
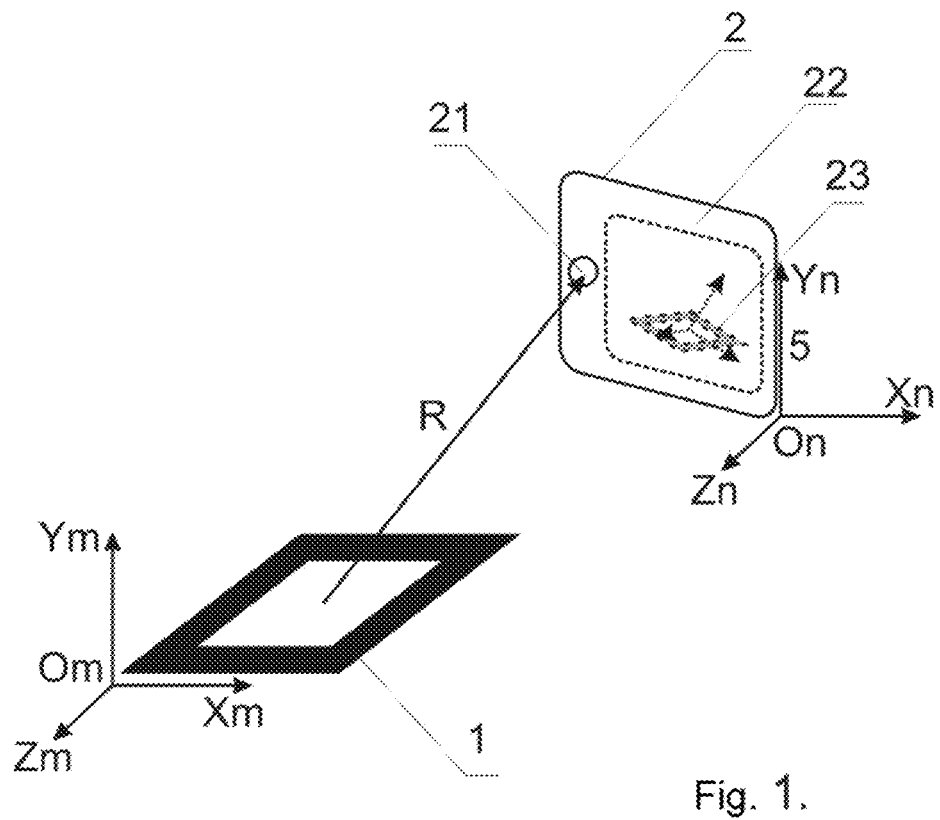
FIG. 1 shows a diagram of an apparatus for interacting with virtual objects according to the invention, FIG. 2 schematically shows the steps of a method of interacting with virtual objects according to the invention.
Figure 2:
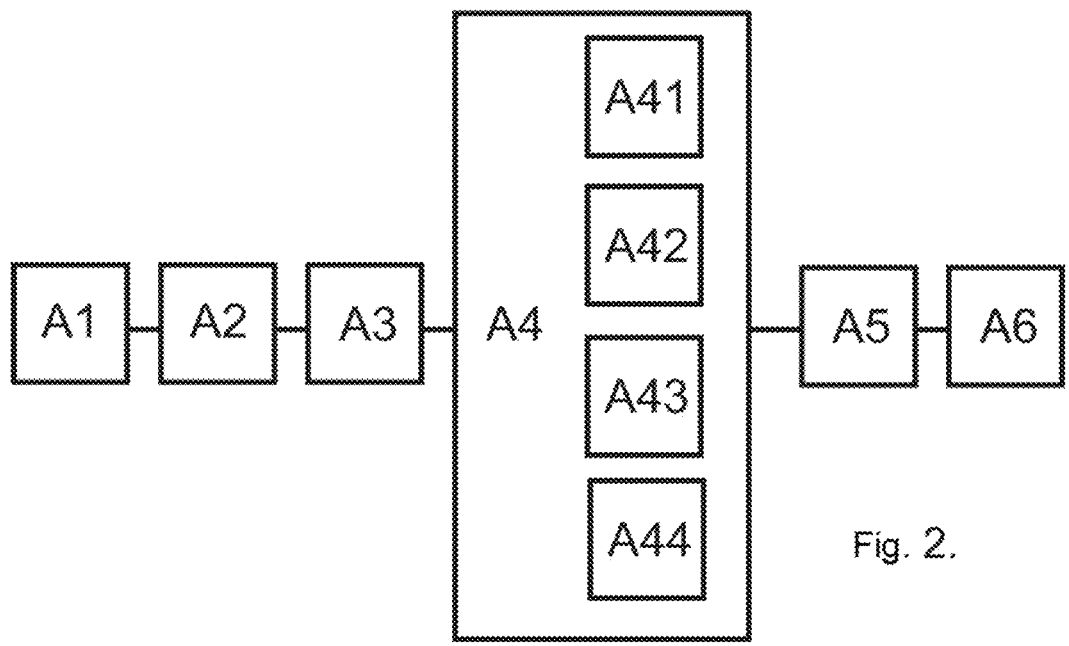

According to FIG. 2:

Step A1. Identify the markers of real three-dimensional space from the images obtained from the device's video camera to create and view augmented reality. In general, a marker can be any figure or object. But in practice, we are limited to allowing a webcam (phone), color rendering, lighting, and processing power of the equipment, as everything happens in real time, and therefore must be processed quickly, and therefore usually select a black and white marker of simple form. A one or more light source of the real three-dimensional environment also can be used as a marker. The efficiency of the processing of the images obtained from the device's video camera can be greatly improved by processed said images with a feature-based algorithm, such as ORB-SLAM algorithm using preliminary processing system described below.

Step A2. Form a physical base coordinate system tied to the spatial position of the markers of a real three-dimensional space.

Step A3. Specify the coordinates of three-dimensional virtual objects of augmented reality in the base coordinate system.

Step A4. Determine coordinates of the device adapted to create and view the augmented reality relative to the base coordinate system by analyzing the image from the camera of the device. The analysis can be performed using preliminary processing system described below.

Step A41. To do this, a virtual camera is set in the calculated coordinates of the device adapted to create and view the augmented reality relative to the physical base coordinate system so that the marker visible by the virtual camera is located in its field of view in the same way as the physical marker is located in the field of view of the camera of the device adapted for creating and viewing augmented reality.

Step A42. The vector corresponding to the direction from the marker to the virtual camera in real time is calculated.

Step A43. Form in real time information about all movements of the camera relative to the marker—turning, approaching, tilting by sequential iteration.

Step A44. Alternatively, generate information about all movements of the camera relative to the marker by analyzing the video stream received from the device to create and view the augmented reality. The movement information can be generated using preliminary processing system described below.

Step A5. The above actions are repeated at each iteration of the running of the computing module of the device adapted to create and view augmented reality. Aggregation of the directions received from each iteration forms information about all the camera movements relative to the marker—turning, approaching, tilting, etc.

Step A6. Performing with the help of user motion the specified actions for modifying virtual objects for all or a part of objects of the formed set of virtual objects of augmented reality. Virtual object can also react to the position of the device in space or position of the light sources captured by the camera of the device as markers.

The sequence of steps is exemplary and allows you to rearrange, subtract, add, or perform some operations simultaneously without losing the ability to interact with virtual objects. Examples of such operations can be:

calculation of movement in the position space of the device to create and view augmented reality with the use of corrections that compensate for the vibration of the user's client device. For example, vibration compensation of a user's user device is performed using a Kalman filter.

when calculating the movement in the space of the device, a model of artificial neural networks is used to create and view augmented reality.

According to an embodiment of the invention, a computational intensity of the processing of the images captured by the camera, a system of preliminary image processing is implemented that allows to use computationally intensive feature-based algorithms such as ORB-SLAM. Said preliminary image processing system allows to identify the most promising areas for detecting object features on the images coming from the camera. In order to implement this solution, FAST (Features from Accelerated Segment Test) descriptor search algorithms can be used. As a result of an image being processed by FAST algorithm, a set of so-called FAST points, is generated. Once FAST points have been identified on the image, their subset forms a set of interest points are selected, as described above. The next iteration of processing to find the next set of FAST points is done only in the most promising area that is defined around each interest point with a certain radius using descriptor scaling factor.

With each iteration (to a certain threshold of iterations) the radius around the interest points is reduced by a scaling factor. During experiments performed with the descriptor, it was determined that the optimal scaling factor coefficient is $\sqrt{2}$. When scaling factor coefficient of $\sqrt{2}$ is used and FAST points are found with a threshold of 35 iterations in the original image, greater repeatability of the result is achieved, i.e. the ratio of stable points to newly found is approximately 70%. Since some points of the image are removed by the proposed coefficient, the descriptor created on the same image scale will be successfully matched with the descriptor of the image with reduced resolution (or density).

Furthermore, according to an embodiment of the invention, in addition or instead of other types of markers, certain light sources can be used as the markers of the real three-dimensional space, as set forth in Step A1 above. In particular, the change in position of the device can be determined based upon recognizing the position of the light sources captured by the camera of the device, therefore the position of the virtual camera can be adjusted and recognized light sources can be positioned within the augmented reality environment.

The light sources used may comprise laser emitter, natural light sources, such as sun, infrared light sources, domestic light bulb etc. Criteria for choosing a light source as a marker can be defined based upon basic characteristics of the light sources, including stability of its position in relation to other markers, type of light emitted etc. Accordingly, when light sources used as a markers, the positioning of the light sources in real three-dimensional space can be used when determining position of the virtual camera and required actions of the virtual object.

Furthermore, depending on the programming of the virtual object, the virtual object can react or activate a certain action or dynamic series of actions in response to a simple presence of a certain light source and/or any combination of the captured by the camera light source qualities or characteristics, such as intensity of color, spectrum, color, frequency and position of the light source with relation to the virtual object in the augmented reality. The light sources can be classified and recognized by the device as an element that triggers reaction of the virtual object, i.e. directing element. In order for a light source to be recognized as a directing element for the virtual object certain conditions should be met. For example, in order to be recognized as a directing element, the light emitted by the light source should have a certain intensity, frequency, spectrum, color etc. A flashing light can also be used as a direction for action of the virtual object. In this case the flashing pattern can be recognized and used as a command. Any of the mentioned above characteristics of the light that is emitted by the light source alone or in combination with one another can be recognized as a certain command. For example, a virtual object can react in one way to yellow light and in a different way to a red light, and in yet different way to a flashing red light. Similarly, the reaction of the virtual object can be different to the light with different intensity.

Example 1

A character created as an augmented reality object (a person or an animal) can follow the light. A character can also hide from the light, of cover its face when the light from the light source gets into its eyes. The color of the character can change depending on the light falling onto it. Also, a shadow of the virtual object within the augmented reality environment can be shown depending on the position of the light source.

Example 2

A character created as an augmented reality object (a person or an animal) can follow by it's eyes the direction of the device adapted to create and view the augmented reality, creating the user's illusion that this person or animal is watching him in a way that a real man or animal would do. When a user tries to get around the character from the back, the character can react accordingly, turning the body towards the user.

Example 3

An interactive game, wherein the marker in the role of the content of augmented reality is a conventional opponent, shooting toward the user by missiles moving at low speed. To win the game, the user must "avoid" from the missiles, shifting the device's camera adapted to create and view the augmented reality from their trajectory.

INDUSTRIAL APPLICABILITY

The proposed method of interaction with virtual objects can be carried out by a skilled person and, when implemented, ensures the achievement of the claimed designation, which allows to conclude that the criterion "industrial applicability" for the invention is met.

In accordance with the present invention, a prototype of a device for interacting with virtual objects is made in the form of a computer tablet having a display and a video camera.

Tests of the prototype system showed that it provides the following capabilities:
  definition of markers of real three-dimensional space from images obtained from video camera of the device adapted to create and view augmented reality,
  the formation of a physical base coordinate system tied to the spatial position of the markers of a real three-dimensional space,
  determine the coordinates of the device adapted to create and view the augmented reality relative to the base coordinate system;
  assign of coordinates of three-dimensional virtual objects of augmented reality in the base coordinate system;
  determine the coordinates of the device adapted to create and view augmented reality relative to a real physical marker by analyzing the image from the device's camera,
  set location of the virtual camera in the calculated coordinates of the device adapted to create and view augmented reality relative to the physical base coordinate system so that the marker visible by the virtual camera located in its field of view in the same way as the physical marker is located in the field of view of the camera of the device adapted to create and view augmented reality, calculate the vector corresponding to the direction from the marker to the virtual camera in real time, generate information about all movements of the camera relative to the marker—rotate, zoom, tilt by sequential iteration in real time.

perform with the help of user motion the specified actions for modifying virtual objects for all or a part of objects from the generated set of virtual objects of augmented reality.

Thus, the present invention achieves the stated objective of providing an additional ability of interacting with virtual objects by changing the position of the device to create and view the augmented reality associated with additional reactions of the virtual object, in addition to simply changing the orientation of the virtual object on the device display.

What is claimed is:

1. A method for influencing virtual objects of augmented reality, said method comprising the following steps:

obtaining images of a real three-dimensional space by a camera of a device adapted to create and view augmented reality, identifying one or more markers of the real three-dimensional space based upon said images obtained by the camera, wherein at least one of the markers comprises a light source of the real three-dimensional space, using preliminary processing system:

forming a base coordinate system tied to a spatial position of the markers of the real three-dimensional space, determining coordinates of the device adapted to create and view augmented reality relative to the base coordinate system, specifying coordinates of virtual objects of augmented reality in the base coordinate system, modifying at least some of the virtual objects of augmented reality by activating preprogrammed dynamic actions of the at least some the virtual objects based upon identified motion of a user and based upon on characteristics of light emitted by the light source, said light source comprising a laser emitter, an infrared light sources or a domestic light bulb, and/or positioning of the light source within the augmented reality in relation to said virtual objects of the augmented reality, using preliminary processing system setting a virtual camera in the determined coordinates of the device relative to the base coordinate system so that a virtual marker visible by the virtual camera is located in a field of view of the virtual camera in the same way that a marker of the real three-dimensional space is located in a field of view of the camera of the device, calculating a vector corresponding to a direction from the virtual marker to the virtual camera in real time, generating information about all movements of the virtual camera relative to the markers of the real three-dimensional space, said movements comprising rotation, approximation, and tilt, by sequential iteration and in real time, determining whether the light source is a directing element, and modifying virtual objects of the formed set of virtual objects of augmented reality, wherein said modification of the virtual objects comprises virtual objects reacting to at least one of: the position of the device in space, actions of the user captured by the camera, position of the light source and/or characteristics of the light emitted by the light source, if said light source determined as the directing element; and further comprising:

determining FAST points on the acquired image;

determining a first subset of interest points based upon determined FAST points;

define the most promising areas based upon the determined first subset of interest points;

determine object features on the acquired image by performing n iterations of:

determining $n_{th}$ set of FAST points on the acquired image within the most promising areas;

determining $n_{th}$ set of interest points on the acquired image based on the $n_{th}$ set of FAST points;

forming $n_{th}$ most promising areas for detecting object features of the object on the acquired image; said most promising areas are being reduced by a scaling factor of $\sqrt{2}$;

determining coordinates of the object features on the acquired image based upon $n_{th}$ most promising areas selected;

arranging the determined object features in a 3D space.

2. The method of claim 1, wherein the light source is recognized as the directing element if the light emitted by said light source has predetermined characteristics including at least one of: intensity, frequency, spectrum, color.

3. The method of claim 1, comprising setting a virtual camera in the determined augmented reality coordinates based upon determined in the augmented reality coordinates position of the light source.

4. The method of claim 1, wherein the number of iterations is 35.

* * * * *